United States Patent
Tobisawa

[19]

[11] Patent Number: 6,042,199
[45] Date of Patent: Mar. 28, 2000

[54] ANTI-SKID BRAKE CONTROL SYSTEM WITH VACUUM DRIVEN PUMP

[75] Inventor: Yoshio Tobisawa, Higashimatsuyama, Japan

[73] Assignee: Jidosha Kiki Co., Ltd., Tokyo, Japan

[21] Appl. No.: 08/886,250

[22] Filed: Jul. 1, 1997

[30] Foreign Application Priority Data

Jul. 31, 1996 [JP] Japan .................................... 8-201470

[51] Int. Cl.[7] ...................................................... B60T 13/52
[52] U.S. Cl. ..................................... 303/114.3; 303/115.3
[58] Field of Search ............................. 303/113.1, 115.3, 303/114.1, 114.3

[56] References Cited

U.S. PATENT DOCUMENTS 4,807,946 2/1989 Bertone et al. .
4,848,848 7/1989 Klein ..................................... 303/114.3

FOREIGN PATENT DOCUMENTS

4213621 10/1993 Germany .............................. 303/115.3
405254423 10/1993 Japan ................................... 303/115.3

*Primary Examiner*—Matthew C. Graham
*Attorney, Agent, or Firm*—Kanesaka & Takeuchi

[57] ABSTRACT

In case of reducing pressures according to an ABS of the present invention, solenoid valves 14, 15 are turned on and the pressure difference between chambers 24, 23 of a vacuum booster 4 becomes smaller, thereby reducing the brake pressures. Further, solenoid valves 7, 9 are turned on so that brake fluid in W/Cs 8 is discharged to sumps 10, thereby further reducing the brake pressures. At this point, the pressure difference between chambers 55, 56 of a vacuum driven pump 51 also becomes smaller so as to move pistons 54, 61, 62 backward and the brake fluid of the sumps 10 is thus sucked into fluid chambers 63, 64. In case of increasing pressures by the ABS control, the solenoid valves 14, 15, 7, 9 are turned off and the pressure difference between the chambers 24, 23 becomes larger, thereby increasing the brake pressures. At this point, the pressure difference between the chambers 55, 56 becomes larger so as to move the pistons 54, 61, 62 forward and the brake fluid in the fluid chambers 63, 64 is sent to a MCY. Therefore, a pump driven by a motor is no longer required, thereby allowing the ABS to be manufactured lighter and at a lower cost and, in addition, allowing both smaller noise and smaller kick back.

3 Claims, 5 Drawing Sheets

ANTI-SKID BRAKE CONTROL SYSTEM WITH VACUUM DRIVEN PUMP

BACKGROUND OF THE INVENTION

The field of art to which the present invention pertains is an anti-skid brake control system (hereinafter, sometimes referred to as "ABS") which gives an anti-skid brake control (hereinafter, sometimes referred to as "ABS control"). In a vehicle such as an automobile, pedal pressure is boosted and outputted as braking force by a vacuum booster and the anti-skid brake control is given by ABS to control the braking force by reducing and increasing brake pressures. When a tendency is developed during braking, the anti-skid brake control is conducted in such a way that brake pressures in brake cylinders are reduced by discharging braking fluid in brake cylinders of wheels to low pressure accumulators in such a manner as to cancel the tendency toward wheel lock and are increased by returning the discharged brake fluid in the low pressure accumulators to the master cylinder.

Brake systems of various types for vehicles such as automobiles have been proposed each of which is provided with a vacuum booster for boosting pedal pressure to provide greater braking pressure and an ABS for giving an ABS control to cancel a tendency of wheel lock which renders the driving unsteady and extends the stopping distance. One of the conventional ABSs is a return pump type ABS.

Figure 5:
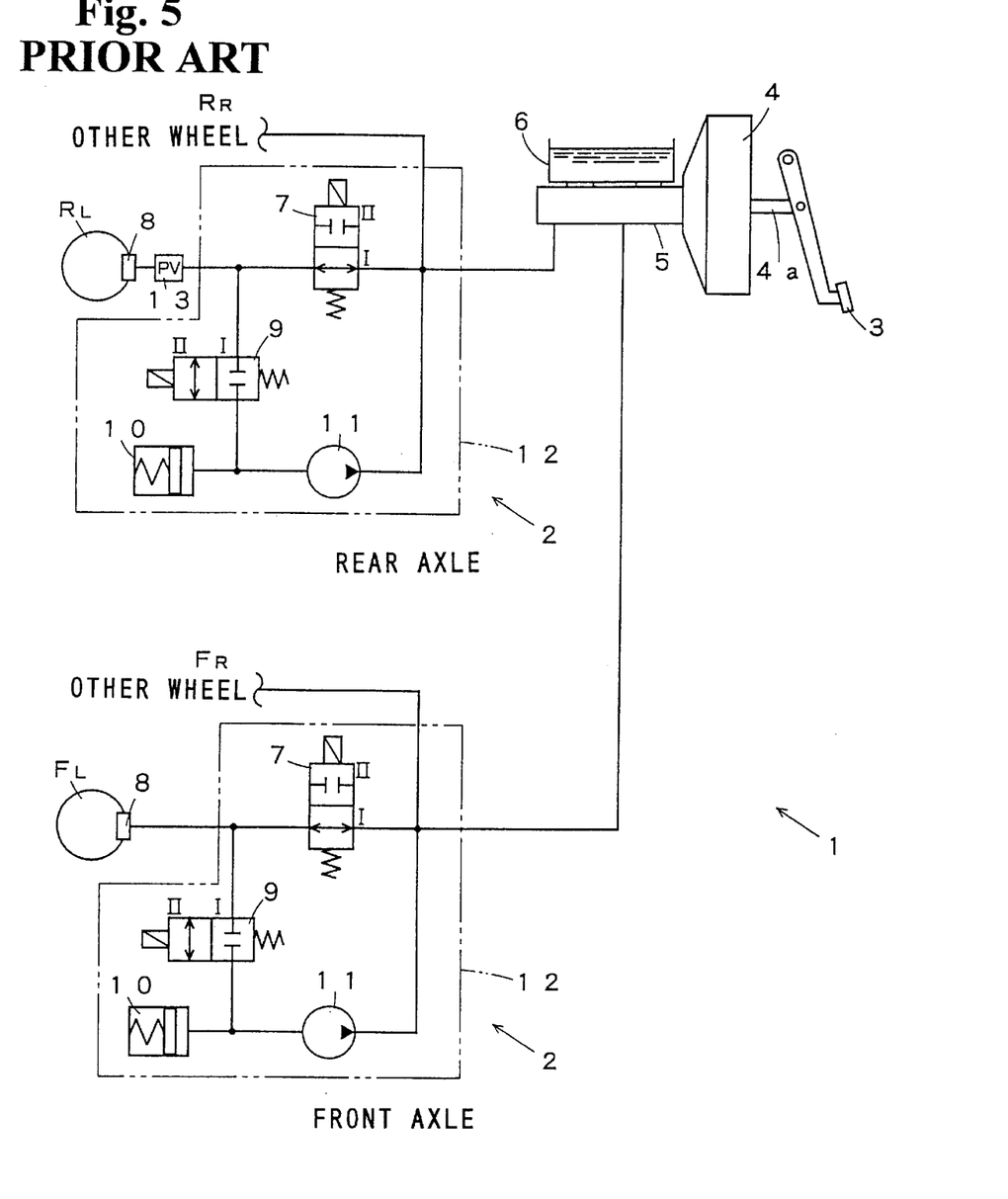
FIG. 5 is a schematic view illustrating one example of a brake system with conventional ABSs.

FIG. 5 is a view showing an example of a conventional braking system with a vacuum booster and a return pump type ABS. As apparent from FIG. 5, the brake system 1 is a dual circuit hydraulic brake actuating system in which front and rear wheels F, R are independent, and comprises ABSs 2 each provided for each braking circuit. Like parts of the respective brakes are given by like reference numerals.

In FIG. 5, the numeral 3 designates a brake pedal, the numeral 4 designates a vacuum booster, the numeral 5 designates a tandem master cylinder (hereinafter, sometimes referred to as "MCY"), the numeral 6 designates a reservoir of the master cylinder 5, the numeral 7 designates each ABS control holding valve which is a normally open solenoid valve in which a communicating position I and an interrupting position II are set, the numeral 8 designates each wheel cylinder (hereinafter, sometimes referred to as "W/C") which communicates with the master cylinder 5 through a brake fluid line, the numeral 9 designates each ABS control pressure-reducing valve which is a normally closed solenoid valve in which an interrupting position I and a communicating position II are set, the numeral 10 designates each sump which is a low pressure accumulator, the numeral 11 designates each ABS control pump (hereinafter, sometimes referred to as just "pump"), the numeral 12 designates each ABS control modulator comprising the ABS control holding valve 7, the ABS control pressure-reducing valve 9, the sump 10, and the pump 11, and the numeral 13 designates a proportioning valve (hereinafter, sometimes referred to as "PV") for the rear wheel for reducing the upward gradient of the brake pressure when exceeding a predetermined value.

Though the brake system 1 is shown only for the front left wheel $F_L$ and the rear left wheel $R_L$ in FIG. 5, the front right wheel $F_R$ and the rear right wheel $R_R$ are provided with the respective ABS control modulators 12 in the same manner.

In the fluid pressure brake system 1 having such conventional ABSs 2, when no force is exerted on the brake pedal 3, the pumps 11 are not actuated so as not to work and the ABS control holding valves 7 and the ABS control pressure-reducing valves 9 are set at the positions I as shown in the drawing. Therefore, the W/Cs 8 of the front and rear wheels F, R communicates with the reservoir 6 of the MCY 5 and no W/C pressure in the W/Cs 8 i.e. no brake fluid pressure is produced.

Upon pedaling the brake pedal 3 for normal braking, an operating rod 4a of the vacuum booster 4 moves forward to switch a control valve (not shown) of the vacuum booster 4 so as to introduce air into a variable pressure chamber of the vacuum booster 4. Therefore, the vacuum booster 4 is actuated to boost the pedal pressure and produce an output which in turn actuates the MCY 5. The MCY 5 produces a MCY pressure which in turn is transferred to the respective W/Cs 8 through the ABS control holding valves 7 in the front wheel brakes and through the ABS control holding valves 7 and PVs 13 in the rear wheel brakes, thereby braking all of the front and rear wheels F, R. At this point, the MCY pressure and W/C pressures are high pressures boosted by the a vacuum booster 4.

Upon releasing the brake pedal 3 to cancel the braking, the vacuum booster 4 and the MCY 5 are not working so as not to produce the MCY pressure and thus the W/C pressure, thereby canceling the braking on the front and rear wheels F, R.

When it is detected that at least one of the front and rear wheels F, R is in locking tendency during normal braking, an electronic control unit (not shown) sets the ABS control holding valves 7 in the ABS control modulators 12 of the front and rear wheels F, R at the interrupting positions II to hold the brake fluid pressures in the W/Cs 8 at the brake fluid pressure at this point to prevent the tendency toward wheel lock from glowing. When it is detected that at least one of wheels is still in the locking tendency even after holding the brake fluid pressure, the electronic control unit sets the ABS control pressure-reducing valve 9 corresponding to that wheel in the communicating position II to discharge the brake fluid of the corresponding W/C 8 to the sump 10 in order to reduce the brake fluid pressure of the W/C 8 and to actuate the corresponding pump 11.

Upon reducing the brake fluid pressure, the tendency toward wheel lock is canceled and the rotation of the wheel is restored to some extent. Then, the electronic control unit sets the ABS control pressure-reducing valve 9 at the interrupting position I and sets the ABS control holding valve 7 at the communicating position I. Therefore, fluid pressure from the pump 11 as well as the MCY fluid pressure is supplied to W/C 8 to increase the brake fluid pressure of the W/C 8 again.

The electronic control unit controls the ABS control holding valves 7, the ABS control pressure-reducing valves 9, and the pumps 11. In this manner, the ABS control is performed by holding, reducing, and increasing the brake fluid pressures until completely canceling the tendency toward wheel lock.

In the brake system 1 with such ABSs 2, the high W/C pressures boosted by the vacuum booster is reduced during the pressure reduction by the ABS control, thereby increasing the amount of the brake fluid to be discharged to the sump 10. Since the low pressure brake fluid discharged to the sump 10 is brought back to the MCY pressure side higher than that of the brake fluid, the pump 11 should have a big capacity (e.g. 25 Mpa; 2 cc/sec) as a return pump. Moreover, a motor of big capacity is also required for driving the pump with such a big capacity. This increases its weight and its cost, and produces excessive noise. Since the brake fluid of the sump 10 is brought back to the higher MCY pressure side by the pump 11, kick back to the brake pedal 3 is grown, thereby making the pedal feeling worse.

SUMMARY OF THE INVENTION

It is an object of the present invention to provide an anti-skid brake control system which no longer requires a pump driven by a motor, thereby allowing the anti-skid brake control system to be manufactured lighter and at a lower cost and, in addition, allowing both smaller noise and smaller kick back.

In order to achieve the aforementioned objects, the present invention provides an anti-skid brake control system characterized by comprising at least: a brake operational member; a vacuum booster having a constant pressure chamber into which negative pressure is always introduced and a variable pressure chamber into which negative pressure is introduced when the vacuum booster is in non-operation and outside air is introduced when the vacuum booster is in operation, the vacuum booster having a control valve which is actuated by the operation of the brake operational member to introduce the outside air into the variable pressure chamber for boosting the operating force of the brake operational member and outputting the boosted force; a master cylinder which is actuated by the output of the vacuum booster to produce master cylinder pressure; a brake cylinder into which the master cylinder pressure is introduced to produce braking force; a low pressure accumulator into which brake fluid of the brake cylinder is discharged; a first solenoid valve which is normally open for controlling the introduction of the outside air into the vacuum booster; a second solenoid valve which is normally closed for controlling the communication between the constant pressure chamber and the variable pressure chamber; a third solenoid valve which is normally open and disposed on the way of a path connecting the master cylinder and the brake cylinder to control the direct communication between the master cylinder and the brake cylinder; a fourth solenoid valve which is normally closed and disposed on the way of a path connecting the brake cylinder and the low pressure accumulator to control the communication between the brake cylinder and the low pressure accumulator; and a vacuum driven pump which is actuated in response to the pressure difference between the variable pressure chamber and the constant pressure chamber of the vacuum booster to suck the brake fluid of the low pressure accumulator and send it to the path between the master cylinder and the third solenoid valve.

The anti-skid brake control system of the present invention is further characterized in that the vacuum driven pump comprises at least a diaphragm piston having one face receiving the pressure of the variable pressure chamber and the other face receiving the pressure of the constant pressure chamber; and a fluid chamber communicating with the low pressure accumulator through a first path and communicating with the master cylinder side than the third solenoid valve through a second path, further comprising a first check valve disposed on the way of the first path to allow only the flow of the brake fluid from the low accumulator to the fluid chamber and a second check valve disposed on the way of the second path to allow only the flow of the brake fluid from the fluid chamber toward the path between the master cylinder side and the third solenoid valve.

The anti-skid brake control system of the present invention is still characterized by comprising a relay valve which outputs negative pressure in non-operation and is actuated by the pressure in the variable pressure chamber to output pressure corresponding to the pressure in the variable pressure chamber, and characterized in that the vacuum driven pump comprises at least a diaphragm piston having one face receiving the pressure outputted by the relay valve and the other face receiving the pressure of the constant pressure chamber; and a fluid chamber communicating with the low pressure accumulator through a first path and communicating with the path between the master cylinder side and the third solenoid valve through a second path, further comprising a first check valve disposed on the way of the first path to allow only the flow of the brake fluid from the low accumulator to the fluid chamber and a second check valve disposed on the way of the second path to allow only the flow of the brake fluid from the fluid chamber toward the path between the master cylinder side and the third solenoid valve.

In the anti-skid brake control system of the present invention, the vacuum driven pump is actuated in response to the pressure difference between the variable pressure chamber and the constant pressure chamber of the vacuum booster during the ABS control to send the brake fluid, which has been discharged from the brake cylinders to the low pressure accumulator during the pressure reduction by the ABS control, to the path between the master cylinder and the third solenoid valve.

The ABS of the present invention employs the vacuum driven pump as mentioned above so that a conventional motor driven pump and its motor are no longer required. This allows the pump for the ABS control to be manufactured lighter, reducing the cost and furthermore allowing smaller noise.

Since the vacuum driven pump is controlled in such a manner as to correspond to the pressure difference of the vacuum booster, thereby making the kick back to the brake control member smaller and rendering the pedal feeling well when the brake fluid is returned to the path connected to the MCY.

Moreover, the brake fluid discharged from the brake cylinder is returned to the MCY side, thereby reducing the volume of brake fluid to be introduced from the MCY to the brake cylinder and allowing the low pressure accumulator to be smaller.

Particularly, the vacuum driven pump is controlled by the output of the relay valve so that the vacuum driven pump can securely operate even when the variation in the pressure in the variable pressure chamber of the vacuum booster is relatively small, thereby stabilizing the operation of the vacuum driven pump.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
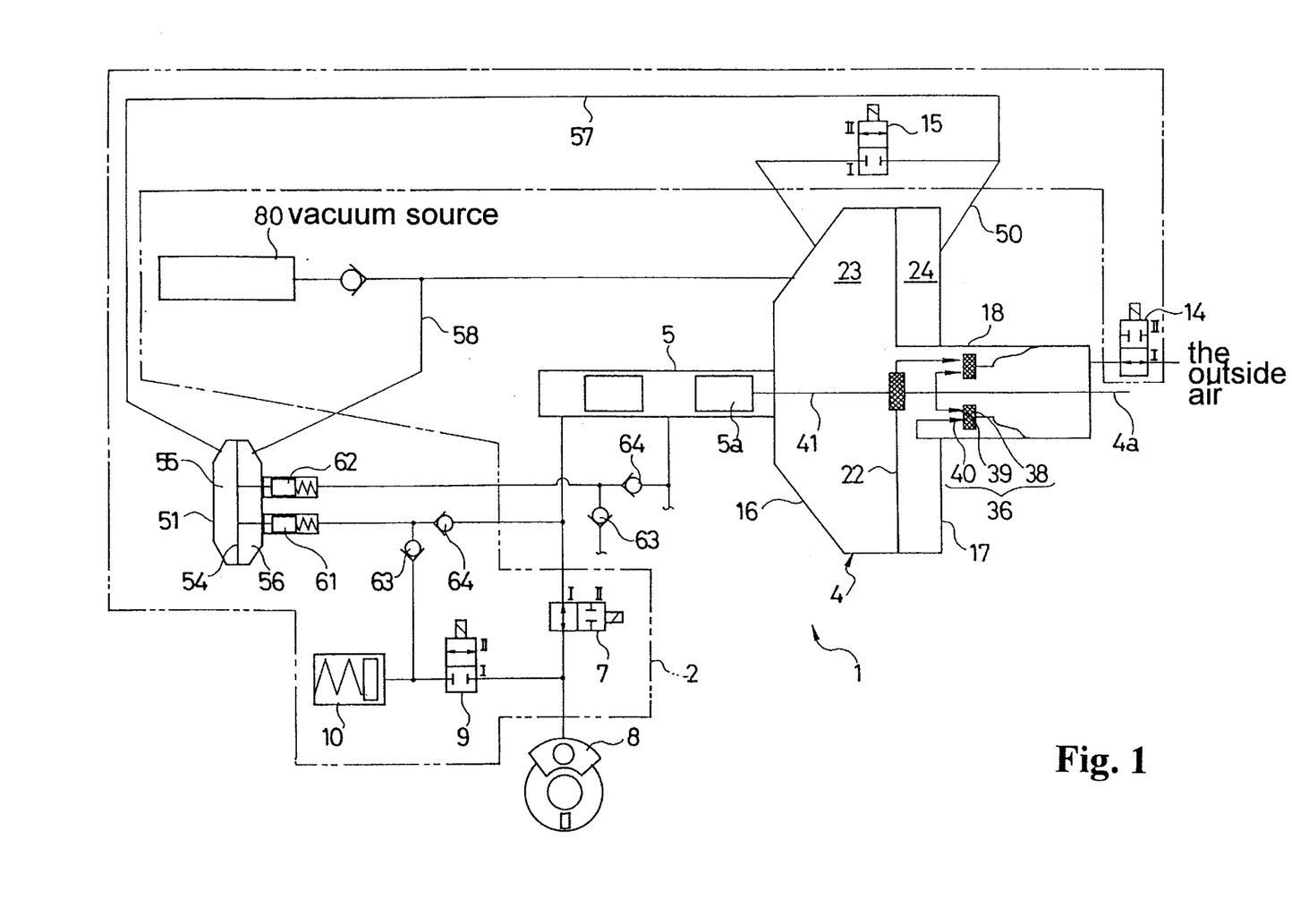
FIG. 1 is a schematic view illustrating one embodiment of an anti-skid brake control system in accordance with the present invention.

FIG. 1 is a schematic view illustrating one embodiment of an anti-skid brake control system according to the present invention. It should be noted that like parts are given by like reference numerals as used in the conventional anti-skid brake control system mentioned above and shown in FIG. 5 so as to omit the detail description about the parts.

Figure 2:
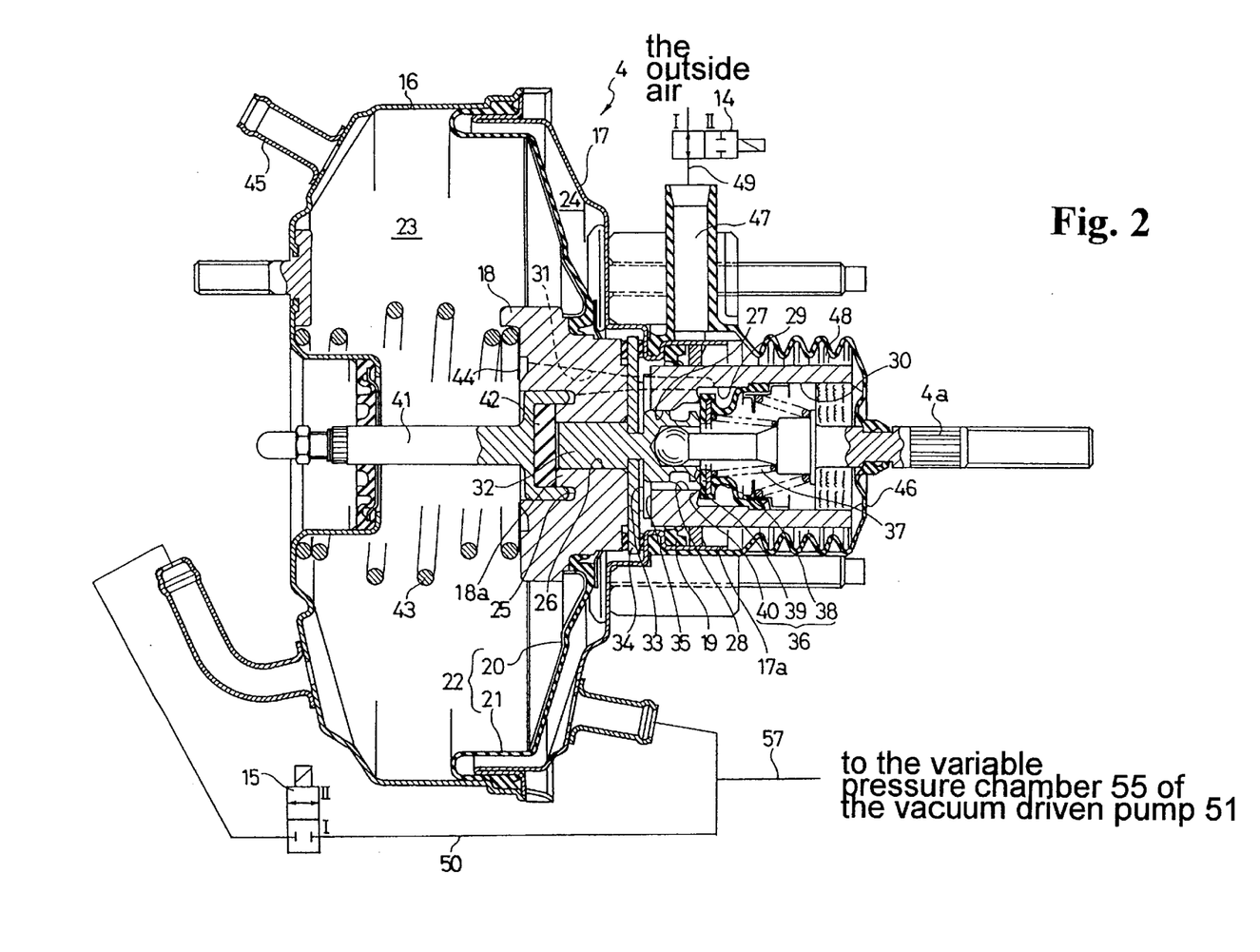
FIG. 2 is a longitudinal sectional view of a vacuum booster shown in FIG. 1.

As shown in FIG. 1, an ABS 2 of this embodiment comprises a first solenoid valve 14, which is normally open, for controlling air introduced into a vacuum booster 4 and a second solenoid valve 15, which is normally closed, for controlling the communication and shutdown between chambers positioned at both sides of a power piston of the vacuum booster 4. The vacuum booster 4 will be concretely described hereinafter. The vacuum booster 4 comprises a front shell 16 and a rear shell 17 which are combined by, for example, bayonet connection as shown in FIG. 2.

The vacuum booster 4 has a valve body 18 which is disposed to extend between the inside and the outside of a space formed by the front shell 16 and the rear shell 17 in such a manner as to pierce the rear shell 17. The valve body 18 is sealingly and slidably supported by the rear shell 17 and a sealing member 19. Interlocked with the valve body 18 is a power piston member 20 disposed in the space between the shells 16, 17. Disposed on the back of the power piston member 20 and between the shells 16, 17 and the valve body 18 is a diaphragm 21. The power piston member 20 and the diaphragm 21 compose the power piston 22 which divides the space between the shells 16, 17 into a constant pressure chamber 23 and a variable pressure chamber 24.

The valve body 18 is provided with a concave portion 25 opened toward the constant pressure chamber 23. The concave portion 25 has a projection 18a, in the center of the bottom thereof, projecting toward the constant chamber 23. The valve body 18 has a first hole 26 formed in the center of the projection 18a so as to open toward the concave portion 25, a second hole 27, a third hole 28, a fourth hole 29, and a fifth hole 30 which are continuously formed following the first hole 26 toward the end of the valve body 18 (a right hand direction in the figure) in the order indicated in such a manner that the fifth hole 30 opens at the end of the valve body 18. The valve body 18 is provided with a path 31 axially formed, through which the constant pressure chamber 23 communicates with the fourth hole 29.

A valve plunger 32 is slidably inserted into the first holes 26 and the second hole 27 of the valve body 18. The valve plunger 32 is interlocked with the operating rod 4a at the right end thereof. The operating rod 4a is connected to a brake pedal (not shown). The valve body 18 is provided with a hole 33, formed in the radial direction thereof in such a manner as to perpendicularly cross the second hole 27, through which a key member 34 is inserted to engage the valve plunger 32 so that the key member 34 is axially movable relative to the valve plunger 32. The key member 34 is able to axially move with the valve plunger 32 within a range of the width of the hole 33 and prevents the valve plunger 32 from coming off the valve body 18. The valve body 18 is also provided with a path 35 formed therein to perpendicularly cross the second hole 27 and to open toward the variable pressure chamber 24. The path 35 also communicates with the third hole 28.

Disposed in the fifth hole 30 of the valve body 18 is a control valve 36. The control valve 36 comprises a valve element 38 always biased by a spring 37, disposed between the valve body 18 and the operating rod 4a, in such a direction toward the valve plunger 32, a first valve seat 39 formed at the right end of the valve plunger 32, and a second valve seat 40 formed in the valve body 18. The control valve 36 allows the communication between the constant pressure chamber 23 and the variable pressure chamber 24 and interrupts the communication between the variable pressure chamber 24 and the outside air when the valve element 38 is seated in the first valve seat 39 and is spaced apart from the second valve seat 40, and interrupts the communication between the constant pressure chamber 23 and the variable pressure chamber 24 and allows the communication between the variable pressure chamber 24 and the outside air when the valve element 38 is spaced apart from the first valve seat 39 and is seated in the second valve seat 40. Therefore, the valve element 38 and the first valve seat 39 compose a breather valve for controlling the introduction of outside air, and the valve element 38 and the second valve seat 40 compose a vacuum valve for controlling the introduction of vacuum.

The vacuum booster 4 is provided with a push rod 41 having a right-end large diameter portion disposed in the concave portion 25 of the valve body 18. The right-end large diameter portion has a concave portion which is slidably engaged with the projection 18a of the valve body 18. In the concave portion of the right-end large diameter portion, a reaction disk 42 is accommodated between the projection 18a and the push rod 41 in such a manner that there is a predetermined space between the valve plunger 32 and the reaction disk 42.

The push rod 41 is prevented from coming off the valve body 18 by a retainer 44 biased in the right direction by a return spring 43 which returns the valve body 18 to a non-operating position. The push rod 41 is interlocked with a primary piston 5a of the master cylinder 5, mounted to the front shell 16, (see FIG. 1) at the left end thereof.

The valve body 18 and the power piston 22 connected to the valve body 18 are normally held in the non-operating positions by the return spring 43 as shown. In the non-operating state, the key member 34 is in contact with the inner surface of the rear shell 17 so as to limit the movement of the valve plunger 32 in the right direction to hold the valve plunger 32 in the rear-most position. When the operating rod 4a is in non-operation, the key member 34 is in a forward position relative to the valve body 18. In this state, the valve element 38 is seated in the first valve seat 39 and slightly spaced apart from the second valve seat 40 so that the variable pressure chamber 24 is blocked from outside air and communicates with the constant pressure chamber 23. When braking, the valve element 38 is seated in the second valve seat 40 and slightly spaced apart form the first valve seat 39 as soon as the operating rod 4a moves forward to operate the valve plunger 32. Therefore, the variable pressure chamber 24 starts to communicate with outside air soon.

The constant pressure chamber 23 always communicates with a vacuum source 80 (shown in FIG. 1), for example an intake manifold of an engine, through a vacuum induction pipe 45 mounted on the front shell 16. Therefore, negative pressure is always introduced into the constant pressure chamber 23.

The rear shell 17 is provided with a cylindrical projection 17a projecting rearwardly and a closed type boot 46 which is made of elastic material such as rubber and disposed between the cylindrical projection 17a and the operating rod 4a to cover the rear end of the valve body 18 completely and to seal the inside of the valve body 18. The boot 46 has a first air path 47 and a tubular second air path 48 formed between the inner surface of the boot 46 and the outer surface of a rearward portion of the valve body 18 so as to allow the communication between the first air path 47 and the fifth hole 30. The first air path 47 is able to communicate with outside air through a third air path 49. Disposed on the third air path 49 is the aforementioned first solenoid valve 14 which is a normally open solenoid valve in which a communicating position I and an interrupting position II are set.

The communication between the constant pressure chamber 23 and the variable pressure chamber 24 can be given by a communication path 50. Disposed on the communication path 50 is the aforementioned second solenoid valve 15 which is a normally closed solenoid valve in which an interrupting position I and a communicating position II are set.

Figure 3:
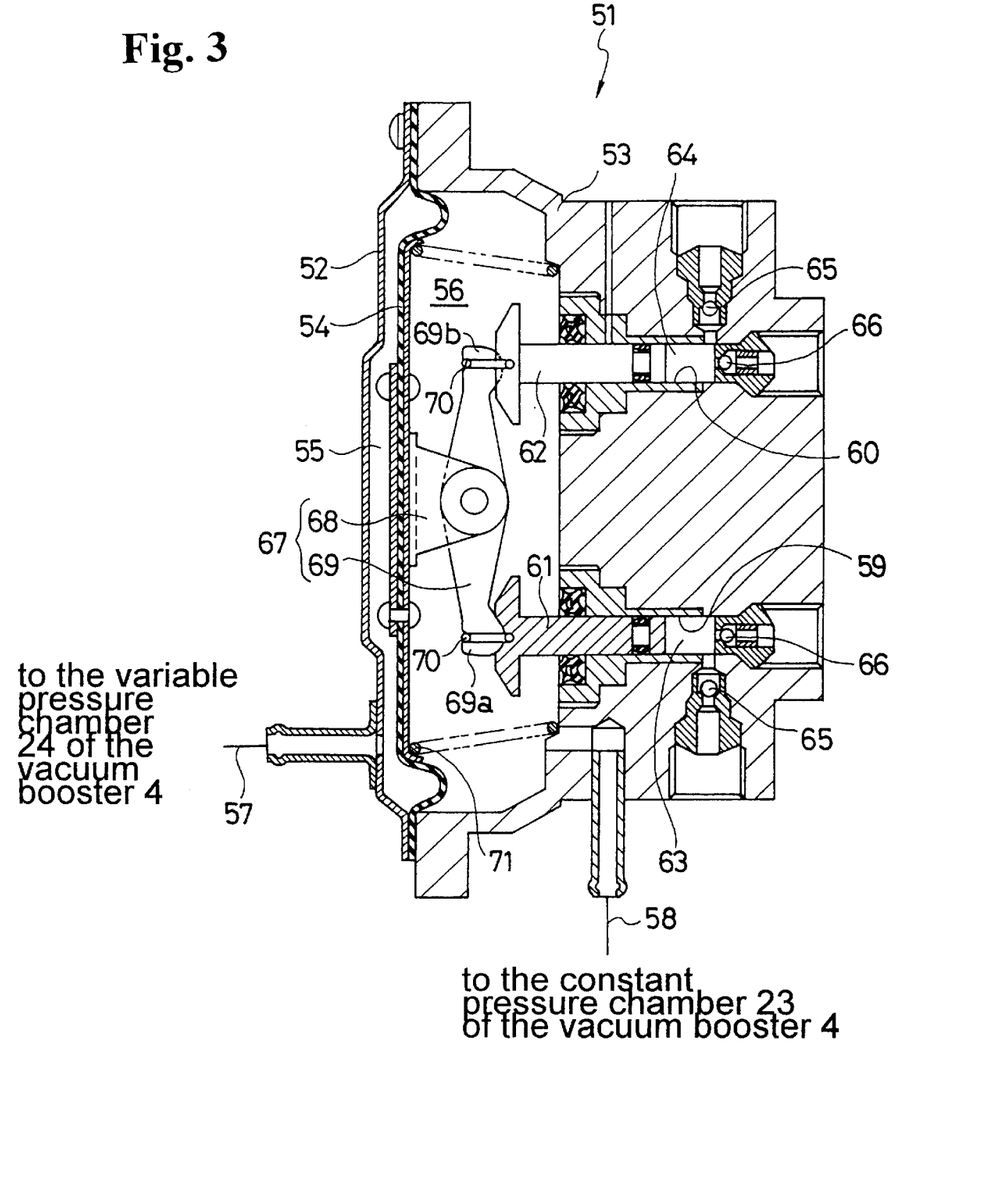
FIG. 3 is a vertical sectional view of a vacuum driven pump shown in FIG. 1.

The ABS 2 is also provided with a vacuum driven pump 51. As shown in FIG. 3, the vacuum driven pump 51 comprises a first housing 52 formed in a plate-like shape and a second housing 53 formed in a cylinder block-like shape. Disposed between the first housing 52 and the second housing 53 is a diaphragm piston 54 through which the first and the second housings 52, 53 are connected to each other. The space formed between the first and second housings 52, 53 is divided into a variable pressure chamber 55 and a constant pressure chamber 56 by the diaphragm piston 54. The variable pressure chamber 55 always communicates with the variable pressure chamber 24 of the vacuum booster 4 through a variable pressure path 57 and the constant pressure chamber 56 always communicates with the constant pressure chamber 23 of the vacuum booster 4. Therefore, the pressure difference between the variable pressure chamber 55 and the constant pressure chamber 56 of the vacuum driven pump 51 is always the same as that between the variable pressure chamber 24 and the constant pressure chamber 23 of the vacuum booster 4. The diaphragm piston 54 is actuated by the pressure difference.

The second housing 53 is provided with two cylinder holes: a first cylinder hole 59 and a second cylinder hole 60, formed parallel with each other, into which a first and second pistons 61 and 62 are fluid-tightly and slidably inserted, respectively. The first and second pistons 61, 62 have one ends projecting into the constant pressure chamber 56 and the other ends defining a first and second fluid chambers 63, 64 in the first and second cylinder holes 59, 60, respectively. The first fluid chamber 63 communicates, through a first check valve 65, with the sump 10 of one of the brake systems and communicates, through a second check valve 66, with a path connecting the master cylinder 5 to a first switching valve 7 of the brake system. The first check valve 65 allows only the flow of the brake fluid from the sump 10 to the first fluid chamber 63 and the second check valve 66 allows only the flow of the brake fluid from the first fluid chamber 63 to the path connecting the master cylinder 5 to the first switching valve 7.

The second fluid chamber 64 also communicates, through another first check valve 65, with the other sump 10 and communicates, through another second check valve 66, with a path connecting the master cylinder 5 to the other first switching valve 7.

The one ends of the first and second pistons 61, 62 are connected to the diaphragm piston 54 through an equalizer 67. The equalizer 67 comprises a supporting member 68 fixed to the diaphragm piston 54 and a pivot lever 69 rotatably supported to the supporting member 68. The both ends 69a, 69b of the pivot lever 69 are connected to the ends of the first and second pistons 61, 62 by spring clips 70, respectively, in such a manner that the pivot lever 69 can rotate relative to the first and second pistons 61, 62.

The diaphragm piston 54 is always biased toward the variable pressure chamber 55 by a return spring 71 so that the first and second pistons 61, 62 are set in the leftmost positions in FIG. 3 when the vacuum driven pump 51 is in non-operation. When the pistons 61, 62 are in the leftmost positions, the first and second fluid chambers 63, 64 have the maximum capacities. As the diaphragm piston 54 moves forward because of the pressure difference between the variable pressure chamber 55 and the constant pressure chamber 56 (the same as the pressure difference between the variable pressure chamber 24 and the constant pressure chamber 23), the pistons 61, 62 move forward to reduce the capacities of the first and second fluid chambers 63, 64 to generate discharge pressures in the first and second fluid chambers 63, 64. The effective areas, receiving pressures, of the diaphragm piston 54 and the pistons 61, 62 are set in such a manner that the discharge pressures thereof become larger than the MCY pressure of the MCY 5 produced at the same point by the output of the vacuum booster 4.

The other brake system is structured the same as the aforementioned brake system so that the description and drawings thereof will be omitted.

Hereinafter, the operation of the brake system 1 provided with the ABS 2 of this embodiment will be described.

When the vacuum booster 4 is in the non-operating position as shown, the valve element 38 of the control valve 36 is seated in the first valve seat 39 and separated apart from the second valve seat 40 so that the breather valve is closed and the vacuum valve is opened. Therefore, negative pressures are developed in the constant pressure chamber 23 and the variable pressure chamber 24 so that the vacuum booster 4 does not work.

The first solenoid valve 14 is set in the communicating position I to allow the communication between the third air path 49 and the outside air and the second solenoid valve 15 is set in the interrupting position I to shut off the communication path 50. Therefore, the fifth hole 30 communicates, through the second air path 48, the first air path 47, the third air path 49, and the first solenoid valve 14 which is open, with the outside air, and the constant pressure chamber 23 and the variable pressure chamber 24 of the vacuum booster 4 do not communicate, through the communication path 50, with each other. Further, the ABS control holding valves 7 are set in the communicating positions I and the ABS control pressure-reducing valves 9 are set in the interrupting positions I. Furthermore, negative pressures are also developed in the variable pressure chamber 55 and the constant pressure chamber 56 of the vacuum driven pump 51 so that the vacuum driven pump 51 do not work.

In this state, upon pedaling the brake pedal 3 for normal braking, the operating rod 4a moves forward toward the valve body 18. The forward movement of the operating rod 4a moves the valve plunger 32 forward relative to the key member 34 and the valve body 18 so that the valve element 38 of the control valve 36 is seated in the second valve seat 40 and the valve element 38 is moved apart from the first valve seat 39 to close the vacuum valve and open the breather valve. Therefore, the outside air communicating with the inside of the fifth hole 30 flows into the variable pressure chamber 24 through the space between the valve element 38 and the first valve seat 39, the third hold 28, and the path 35.

As the outside air flows into the variable pressure chamber 24, the power piston 22 operates and the valve body 18 moves forward so that the vacuum booster 4 outputs forces through the push rod 41 and the pistons 5a, 5b of the MCY 5 operate to produce MCY pressure in the same manner as the conventional one. The MCY pressure is supplied to the W/Cs 8 through the first switching valves 7 so as to operate the normal braking, in the same manner as the aforementioned conventional one. At this point, the MCY pressure is prevented from being supplied to the vacuum driven pump 51 by the second check valves 66.

As the valve element 38 is seated in the first valve seat 39 to close the breather valve, the outside air is prevented from flowing into the variable pressure chamber 24 so as to stop the forward movement of the valve body 18. In this manner, the vacuum booster 4 produces forces boosted in a predetermined servo rate corresponding to the input.

As outside air is introduced into the variable pressure chamber 24 of the vacuum booster 4, the outside air is also introduced into the variable pressure chamber 55 of the vacuum driven pump 51 through the variable pressure path 57. Therefore, produced between the variable pressure chamber 55 and the constant pressure chamber 56 of the vacuum driven pump 51 is pressure difference which is the same as the pressure difference between the variable pressure chamber 24 and the constant pressure chamber 23 of the vacuum booster 4. The pressure difference moves the diaphragm piston 54 forward to move the first and second pistons 61, 62 forward at the same time. The discharge pressures are produced by the forward movement of the first and second pistons 61, 62. Since the discharge pressures are higher than the MCY pressure at this point, the brake fluid in the first and second fluid chambers 63, 64 is supplied to the paths connecting the MCY 5 to the first switching valves 7, through the second check valves 66. At this point, the brake fluid in the first and second fluid chambers 63, 64 is prevented from flowing to the sumps 10 by the first check valves 65.

When releasing the brake pedal 3 to cancel the normal braking, the operating rod 4a moves backward and the valve plunger 32 moves backward relative to the valve body 18 until the key member 34 comes into contact with the rear surface of the hole 33. By the backward movement of the valve plunger 32, the valve element 38 moves apart from the second valve seat 40 to open the vacuum valve so that the outside air introduced into the variable pressure chamber 24 flows toward the vacuum source 80 through the path 35, the third hole 28, the space between the valve element 38 and the second valve seat 40, the path 31, the constant pressure chamber 23, and the vacuum induction pipe 45, thereby lowering the pressure. Therefore, the valve body 18 and the power piston 22 move backward due to the spring force of the return spring 43 so that the vacuum booster 4 shown in FIG. 1 is put in non-operation. Accordingly, the MCY 5 is also put in non-operation so as to cancel the fluid pressure in the W/Cs 8, thus canceling the normal braking.

The outside air supplied into the variable pressure chamber 55 of the vacuum driven pump 51 at this point also flows to the vacuum source 80 through the variable pressure path 57 and the variable pressure chamber 24 of the vacuum booster 4 and, in the same manner as mentioned above, through the vacuum valve of the vacuum booster 4, the constant pressure chamber 23, and the vacuum induction pipe 45 so that the diaphragm piston 54 and the first and second pistons 61, 62 move backward and thus the vacuum driven pump 51 is put in non-operation. Since the backward movement of first and second pistons 61, 62 increases the capacities of the first and second fluid chambers 63, 64, the brake fluid is sucked into the first and second fluid chambers 63, 64 through the first check valves 65.

As a controller (not shown) detects at least one tendency toward wheel lock during braking by the operation of the vacuum booster 4 in the same manner as the conventional general ABS control, both the first and second solenoid valves 14, 15 are turned on so as to close the first solenoid valve 14 and open the second solenoid valve 15. Therefore, the fifth hole 30 is shut off from the outside air and the variable pressure chamber 24 communicates, through the communication path 50 and the second solenoid valve 15 which is open, with the constant pressure chamber 23. The air in the variable pressure chamber 24 thus flows into the constant pressure chamber 23 so that the pressure difference between the variable pressure chamber 24 and the constant pressure chamber 23 becomes smaller, thereby reducing the pressure produced by the vacuum booster 4 and thus reducing the MCY pressure of the MCY 5, i.e. the braking pressures of the W/Cs 8. At the same time, the air in the variable pressure chamber 55 of the vacuum driven pump 51 also flows into the constant pressure chamber 23 of the vacuum booster 4 through the variable pressure path 57.

Due to the reduced pressure of the vacuum booster 4, the valve body 18 moves backward and the valve element 38 moves apart from the first valve seat 39 to open the breather valve. Since the fifth hole 30 is shut off from the outside air, air in the cabin does not flow into the variable pressure chamber 24 even when the breather valve is opened so that the force of the vacuum booster 4 is not boosted.

As the pressure difference between the variable pressure chamber 24 and the constant pressure chamber 23 of the vacuum booster 4 becomes smaller, the pressure difference between the variable pressure chamber 55 and the constant pressure chamber 56 of the vacuum driven pump 51 also becomes smaller so that the diaphragm piston 54 and the first and second pistons 61, 62 move backward. Accordingly, the brake fluid is sucked from the sumps 10 to the first and second fluid chambers 63, 64 through the first check valves 65.

When further reduction in the brake pressure is necessary because the reduction in the brake pressure by reducing the pressure produced by the vacuum booster 4 is insufficient to cancel the tendency toward wheel lock, the controller sets the ABS control holding valves 7 in the interrupting positions II and sets the ABS control pressure-reducing valves 9 in the communicating positions II. Therefore, the W/Cs 8 are blocked from the MCY 5 and communicate with the sumps 10 so that the brake fluid in the W/Cs 8 is discharged to the sumps 10, thereby further reducing the brake pressures of the W/Cs 8.

As the reduced brake pressures restore the wheel rotation to the predetermined rotation, the controller sets the ABS control holding valves 7 in the communicating positions I and the ABS control pressure-reducing valves 9 in the interrupting positions I, and sets the first solenoid valve 14 in the communicating position I and the second solenoid valve 15 in the interrupting position I.

Therefore, the communication between the fifth hole 30 and the outside air is allowed and the communication between the variable pressure chamber 24 and the constant pressure chamber 23 through the communication path 50 is interrupted. In addition, the W/Cs 8 communicate with the MCY 5 and are shut off from the sumps 10. Accordingly, air in the variable pressure chambers 24, 55 is prevented from flowing into the constant pressure chambers 23 and the outside air flows into the variable pressure chamber 24, thereby increasing the output of the vacuum booster 4 and thus increasing the brake pressure. At the same time, the outside air starts to flow into the variable pressure chamber 55 again so that the diaphragm piston 54 and the first and second pistons 61, 62 of the vacuum driven pump 51 move forward again and the brake fluid in the first and second fluid chambers 63, 64 is returned to the paths between the MCY 5 and the ABS control holding valves 7.

In this manner, the ABS control reducing and increasing the brake pressure is performed by repeating on-off controls of the ABS control holding valves 7, the ABS control pressure-reducing valves 9, and the first and second solenoid valves 14, 15 until completely canceling the tendency toward wheel lock. Each time the reduction and increase in the brake pressures are repeated, the brake fluid in the sumps 10 discharged from the W/Cs 8 is returned to the MCY 5 again.

In the ABS 2 of this embodiment, the motor driven pump 11 and its motor which are heavy, costly, and noisy are no longer necessary because the vacuum driven pump is employed. This allows the pump for the ABS control to be manufactured lighter at a lower cost and furthermore allows smaller noise.

The vacuum driven pump 51 is interlocked with the vacuum booster 4 with the same pressure difference as the vacuum booster 4, thereby making the kick back to the brake pedal 3 smaller and rendering the pedal feeling well.

The brake fluid discharged from the W/Cs 8 can be returned to the MCY 5, thereby reducing the volume of brake fluid to be introduced from the MCY 5 to the W/Cs 8 and allowing the sumps 10 to be smaller.

Figure 4:
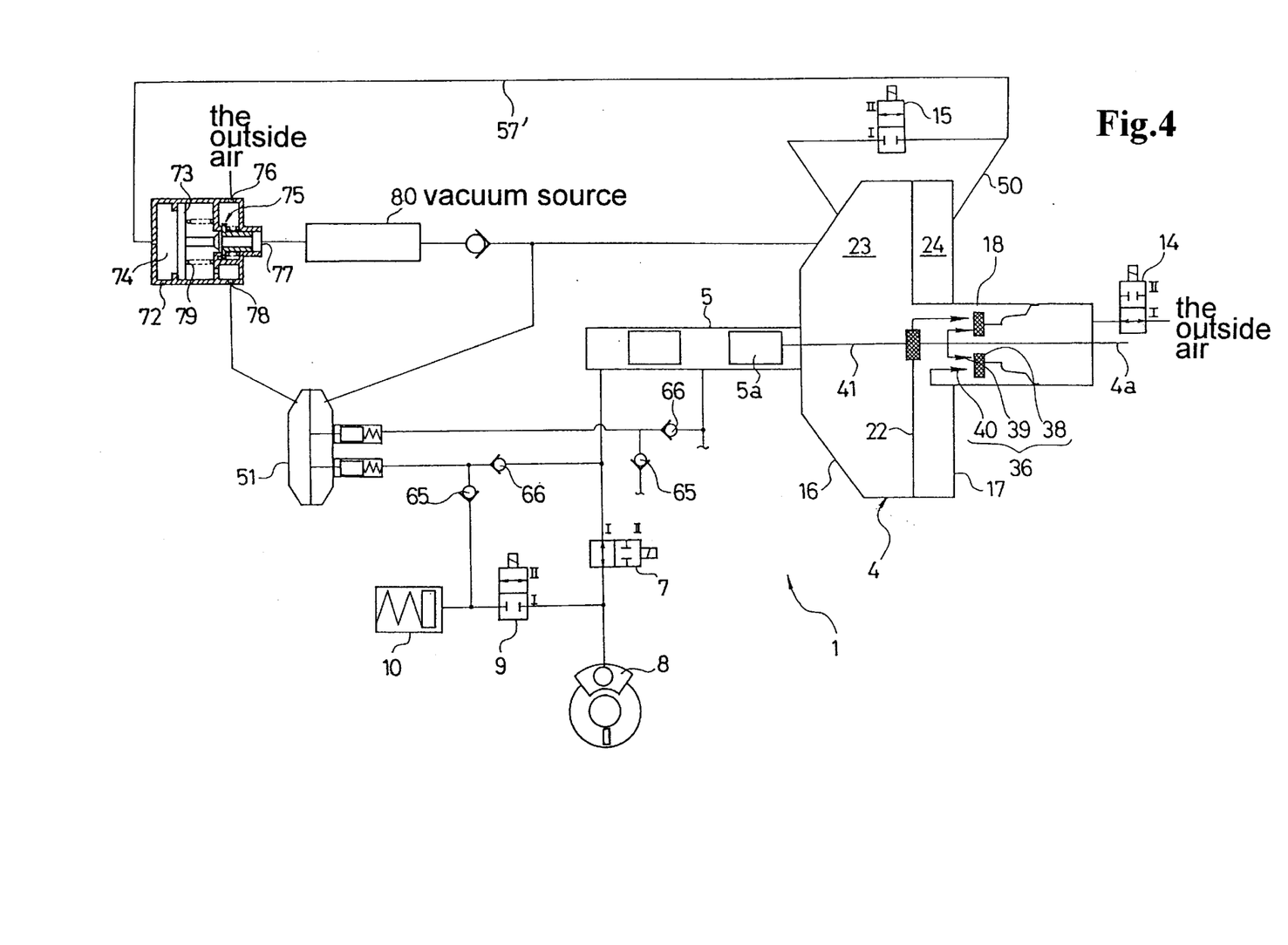
FIG. 4 is a schematic view illustrating another embodiment of the present invention.

FIG. 4 is a schematic view similar to FIG. 1 illustrating another embodiment of the present invention. It should be noted that like parts are given by like reference numerals as used in the aforementioned embodiment shown in FIG. 1 through FIG. 3 so as to omit the detail description about the parts.

For example, the variation in the brake pressures by the ABS control is small when driving on a slippery road (a low-$\mu$ road) so that the variation in pressures of both the variable pressure chambers 24, 55 is also small. However, since in the ABS 2 of the aforementioned embodiment, the variable pressure chamber 24 of the vacuum booster 4 and the variable pressure chamber 55 of the vacuum driven pump 51 directly communicate with each other through the variable pressure path 57 in such a manner that air introduced into the variable pressure chamber 24 is directly introduced into the variable pressure chamber 55 to drive the vacuum driven pump 51, the possibility of unsuitable operation of the vacuum driven pump 51 when the variation in the pressure of the variable pressure chamber 55 is small as mentioned above.

Taking such a circumstance into consideration, in the ABS 2 of this embodiment, the introduction of air and negative pressure into the variable pressure chamber 55 of the vacuum driven pump 51 is controlled by a relay valve 72 as shown in FIG. 4 and the operation of the relay valve 72 is controlled by the pressure in the variable pressure chamber 24 of the vacuum booster 4. The relay valve 72 is well known in the art. The relay valve 72 shown in FIG. 4 as a typical one of the known relay valves comprises a control piston 73, a control pressure chamber 74 which is defined by the control piston 73 and always communicates, through a control signal pressure path 72', with the variable pressure chamber 24 of the vacuum booster 4, a switching control valve 75 actuated by the control piston 73, an air duct 76, a vacuum port 77 always communicating with the vacuum source 80, a pump port 78 always communicating with the vacuum driven pump 51, and a return spring 79 always biasing the control piston 73 in the non-operating direction.

When the variable pressure chamber 24 is vacuumed, the control pressure chamber 74 is also vacuumed so that the control piston 73 is set in the non-operating position as shown and the switching control valve 75 shut off the pump port 78 from the air duct 76 and connects the pump port 78 to the vacuum port 77. Therefore, negative pressure from the vacuum source 80 is introduced into the variable pressure chamber 55 through the vacuum port 77, the switching control valve 75, and the pump port 78 so that the vacuum driven pump 51 is set in the leftmost position as shown. At this point, the negative pressure from the vacuum source 80 is applied to the surface of the control piston 73 opposite to the control pressure chamber 74.

When outside air is introduced into the variable pressure chamber 24, outside air is also introduced into the control pressure chamber 74 so that the control piston 73 moves to the right in FIG. 4 to switch the switching control valve 75 and the switching control valve 75 thus shuts off the pump port 78 from the vacuum port 77 and connects the pump port 78 to the air duct 76. Therefore, the outside air is introduced into the variable pressure chamber 55 through the air duct 76, the switching control valve 75, and the pump port 78 so that the diaphragm piston 54 moves to the right. Accordingly, the first and second pistons 61, 62 also move to the right so that the brake fluid in the first and second fluid chambers 63, 64 is introduced to the paths between the master cylinder 5 and the ABS control holding valves 7. At this point, the same pressure as the pressure introduced into the variable pressure chamber 55 is applied to the surface of the control piston 73 opposite to the control pressure chamber 74 so that the output of the relay valve 72 i.e. the pressure of the variable pressure chamber 55 becomes greater pressure relative to the pressure of the control pressure chamber.

Since the relay valve 72 is actuated by a relatively small control signal pressure introduced into the control pressure chamber 74, the relay valve 72 securely operates in response to the variation in the pressure so as to produce great output relative to the pressure of the variable pressure chamber 24 even when the variation in the pressure of the variable pressure chamber 24 of the vacuum booster 4 during ABS control is small as mentioned above.

According to the ABS 2 of this embodiment, the vacuum driven pump 51 can securely operate even when the variation in the pressure during ABS control is small, thereby rendering the ABS control suitable.

It should be noted that the relay valve 72 may be one in which a diaphragm piston is employed and a slide valve is employed as the switching control valve 75.

As apparent from the above description, the ABS of the present invention employs the vacuum driven pump so that a conventional motor driven pump and its motor are no longer necessary, thereby allowing the pump for the ABS control to be manufactured lighter, reducing the cost and furthermore allowing smaller noise.

Since the vacuum driven pump is controlled in such a manner as to correspond to the pressure difference of the vacuum booster, thereby making the kick back to the brake control member smaller and rendering the pedal feeling well when the brake fluid is returned to the MCY side.

According to the present invention, the brake fluid discharged from the brake cylinder is returned to the MCY side, thereby reducing the volume of brake fluid to be introduced from the MCY to the brake cylinder and allowing the low pressure accumulator to be smaller.

Particularly, the vacuum driven pump is controlled by the output of the relay valve so that the vacuum driven pump can securely operate even when the variation in the pressure in the variable pressure chamber of the vacuum booster is relatively small, thereby stabilizing the operation of the vacuum driven pump.

What we claim is:

1. An anti-skid brake control system comprising:

a brake operational member;

a vacuum booster having a constant pressure chamber into which negative pressure is always introduced and a variable pressure chamber into which negative pressure is introduced when the vacuum booster is in non-operation and outside air is introduced when the vacuum booster is in operation, said vacuum booster having a control valve which is actuated by the operation of said brake operational member to introduce the outside air into said variable pressure chamber for boosting the operating force of said brake operational member and outputting the boosted force;

a master cylinder which is actuated by the output of said vacuum booster to produce master cylinder pressure;

a brake cylinder into which the master cylinder pressure is introduced to produce braking force;

a low pressure accumulator into which brake fluid of the brake cylinder is discharged;

a first solenoid valve which is normally open for controlling the introduction of the outside air into said vacuum booster;

a second solenoid valve which is normally closed for controlling the communication between said constant pressure chamber and said variable pressure chamber;

a third solenoid valve which is normally open and disposed on the way of a path connecting said master cylinder and said brake cylinder to control the direct communication between said master cylinder and said brake cylinder;

a fourth solenoid valve which is normally closed and disposed on the way of a path connecting said brake cylinder and said low pressure accumulator to control the communication between said brake cylinder and said low pressure accumulator; and a vacuum driven pump which is actuated in response to the pressure difference between said variable pressure chamber and said constant pressure chamber of said vacuum booster to suck the brake fluid of said low pressure accumulator and send it to the path between said master cylinder and said third solenoid valve.

2. An anti-skid brake control system as claimed in claim 1, wherein said vacuum driven pump comprises at least a diaphragm piston having one face receiving the pressure of said variable pressure chamber and the other face receiving the pressure of said constant pressure chamber; and a fluid chamber communicating with said low pressure accumulator through a first path and communicating with said master cylinder side than said third solenoid valve through a second path, further comprising a first check valve disposed on the way of said first path to allow only the flow of the brake fluid from said low accumulator to said fluid chamber and a second check valve disposed on the way of said second path to allow only the flow of the brake fluid from said fluid chamber toward the path between said master cylinder side and the third solenoid valve.

3. An anti-skid brake control system as claimed in claim 1, further comprising a relay valve which outputs negative pressure in non-operation and is actuated by the pressure in said variable pressure chamber to output pressure corresponding to the pressure in said variable pressure chamber, wherein said vacuum driven pump comprises at least a diaphragm piston having one face receiving the pressure outputted by said relay valve and the other face receiving the pressure of said constant pressure chamber; and a fluid chamber communicating with said low pressure accumulator through a first path and communicating with the path between said master cylinder side and said third solenoid valve through a second path, further comprising a first check valve disposed on the way of said first path to allow only the flow of the brake fluid from said low accumulator to said fluid chamber and a second check valve disposed on the way of said second path to allow only the flow of the brake fluid from said fluid chamber toward the path between said master cylinder side and the third solenoid valve.

* * * * *